July 15, 1969   H. J. FEIGEL   3,455,082
CONTAINER LENGTH SENSING DEVICE
Filed March 31, 1966   5 Sheets-Sheet 1
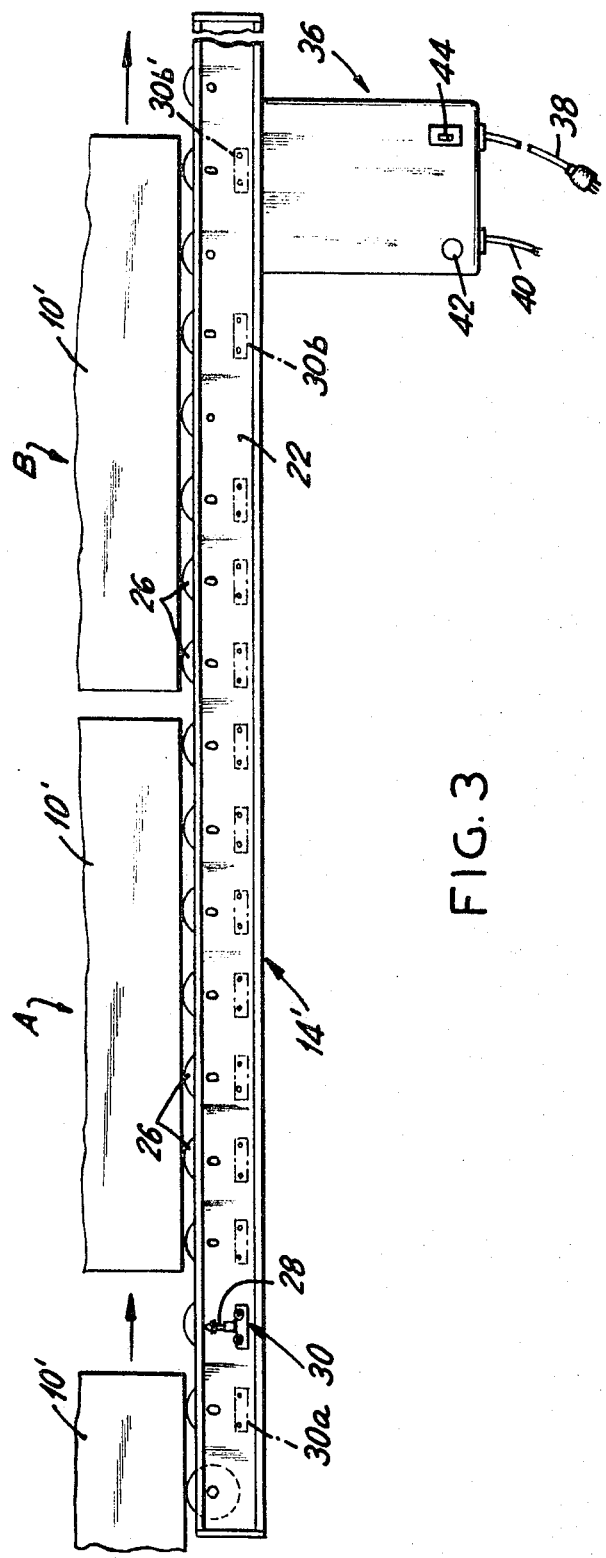
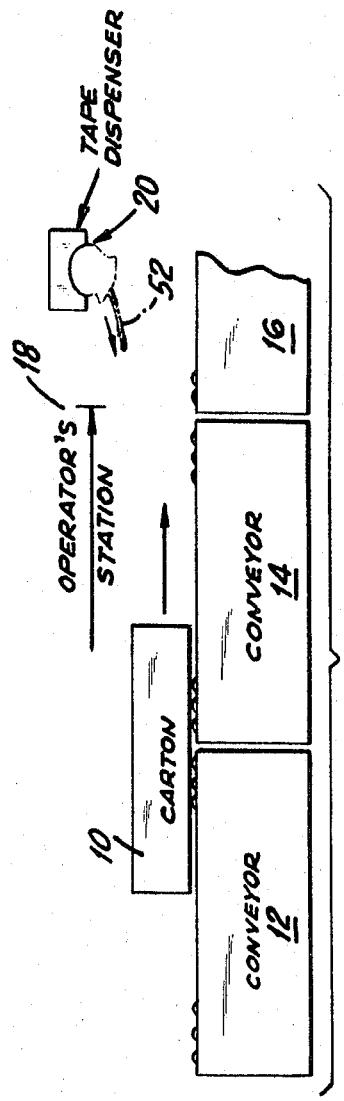
INVENTOR.
HAROLD J. FEIGEL
BY
ATTORNEYS.

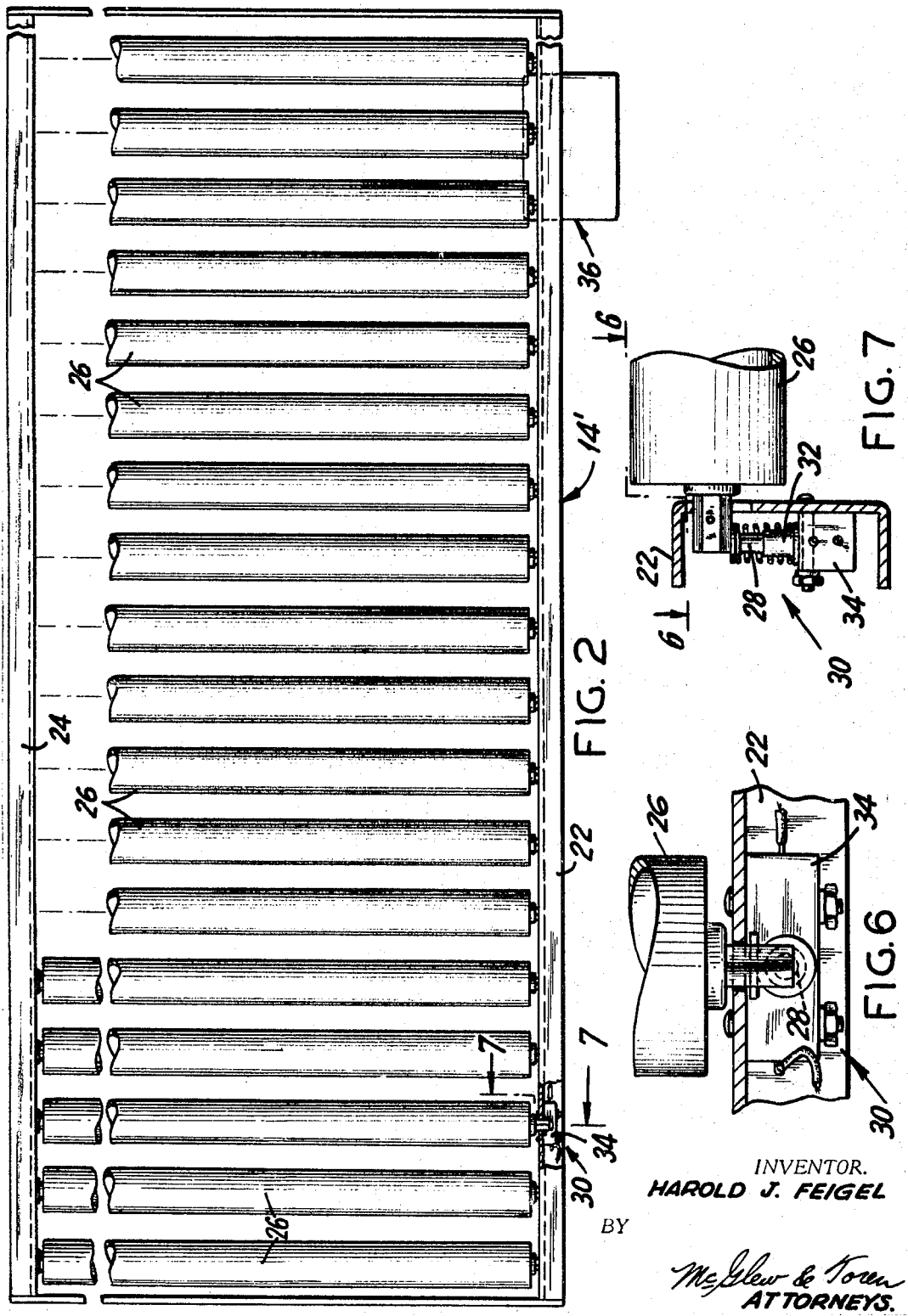

July 15, 1969 H. J. FEIGEL 3,455,082
CONTAINER LENGTH SENSING DEVICE
Filed March 31, 1966 5 Sheets-Sheet 3

INVENTOR.
HAROLD J. FEIGEL
BY
McGlew & Toren
ATTORNEYS

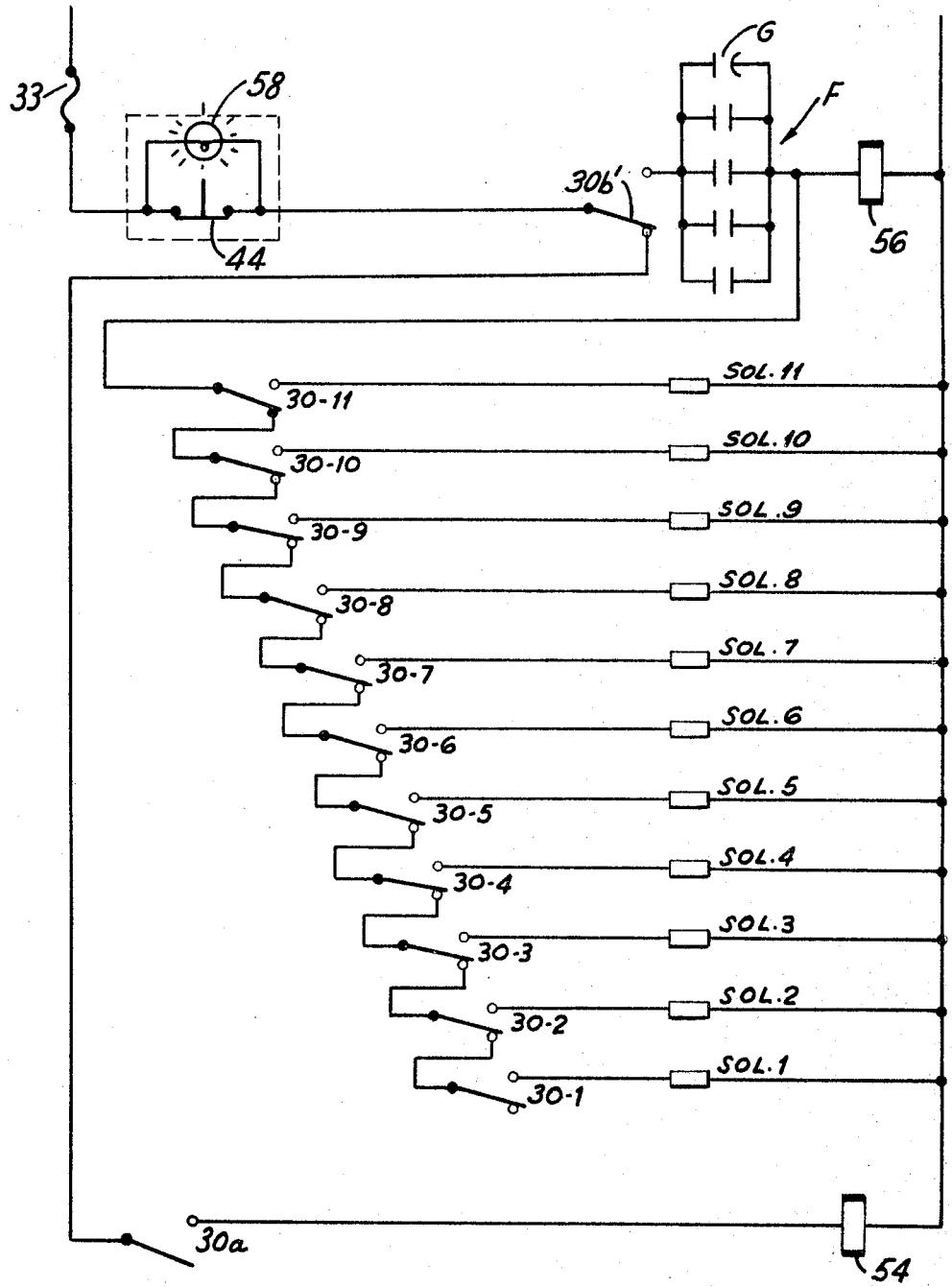

United States Patent Office 3,455,082
Patented July 15, 1969

3,455,082
CONTAINER LENGTH SENSING DEVICE
Harold J. Feigel, West Englewood, N.J., assignor to
General Gummed Products, Inc., Linden, N.J.
Filed Mar. 31, 1966, Ser. No. 539,153
Int. Cl. B65b 57/02, 61/16
U.S. Cl. 53—66                9 Claims

ABSTRACT OF THE DISCLOSURE

A container length sensing device and a tape dispenser actuator comprises a plurality of switches located along a feedpath for a carton to be sealed by a closure tape. The switches include actuators which are moved when a container is moved along the pathway over each particular switch actuator. An indication of the container length is obtained when the forward end of the container hits the last switch actuator and depends on the number of switches behind the last switch which still remain actuated by the influence of the trailing end of the container. The electrical circuit includes means for operating the feed-out of a tape dispenser to dispense a length of tape in accordance with the size of the container sensed by the switches.

SUMMARY OF THE INVENTION

This invention relates in general to container handling equipment and in particular to a new and useful device for dispensing a length of strip sealing material in accordance with a length of the container being transported over a conveyor mechanism.

At the present time there are known devices for dispensing lengths of sealing tape for sealing containers in lengths which may vary in accordance with the size of the carton to be sealed. Such devices include selection means for directing a length of sealing tape of a predetermined amount outwardly from a tape dispensing machine. An example of such a machine is disclosed and described in Patent No. 3,043,148 dated July 10, 1962, and filed by Theodore H. Krueger.

The present invention provides a device which is useable with machines of this type or similar machines having means for selectively dispensing a predetermined length of strip material therefrom. The present invention is an improvement over the prior art in that it provides means associated with a conveyor for moving a container to automatically operate a tape dispensing device to effect ejection of a sealing tape of a length which is comparable to the length of the container which is moved over the conveyor. In accordance with the invention there is provided a conveyor which includes, for example, roller means for moving a carton or a container thereover. The roller means includes means for sensing the length of a container which passes over the rollers, and it further includes means for actuating a selective one of a plurality of dispensing buttons or switches of a tape dispensing machine to dispense a length of strip material which compares to the length of the container which has been indicated. In accordance with one embodiment of the invention, the rollers advantageously include a plurality of switches with an initial switch in the series being actuated upon the movement of a container over a roller which overlies the associated switch. Actuation of this initial switch closes a circuit so that it will be possible for further actuation of any one of a plurality of switches which are located at equally spaced locations along the length of the conveyor line. These latter switches will be selected for actuation only when the final switch member is actuated by the passing of the forward end of the container over this final switch. When the final switch is actuated, then the last switch in the line which is covered by the rear portion of the container will actuate a solenoid for effecting the pressing of a key of a tape dispenser. The key which is selected will dispense a length of strip sealing material commensurate with the size of the container length which has been indicated.

Accordingly, it is an object of the invention to provide means for sensing the length of a container and for dispensing a length of strip sealing material for the container in accordance with the length which is sensed.

A further object of the invention is to provide a conveyor system for a container having a plurality of rollers over which the container is adapted to be passed which includes switch sensing means which are actuable upon the depressing of rollers for the purpose of dispensing a length of strip sealing material in accordance with the length of the container which passes over the rollers.

A further object of the invention is to provide a device for dispensing strip sealing material for containers which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a somewhat schematic partial elevational view of a conveyor system having a carton length measuring means for actuating a tape dispenser to dispense a length of strip material in accordance with the length of the container sensed and constructed in accordance with the invention;

FIG. 2 is a top plan view of a conveyor having a container length sensing means thereon constructed in accordance with the invention;

FIG. 3 is a partial side elevational view of the conveyor indicated in FIG. 2;

FIG. 6 is a partial section taken along the line 6—6 of FIG. 7;

FIG. 7 is a partial section taken along the line 7—7 of FIG. 2; and

FIG. 8 is a diagrammatic indication of the wiring diagram for the sensing means and tape dispensing actuator.

Figure 4:
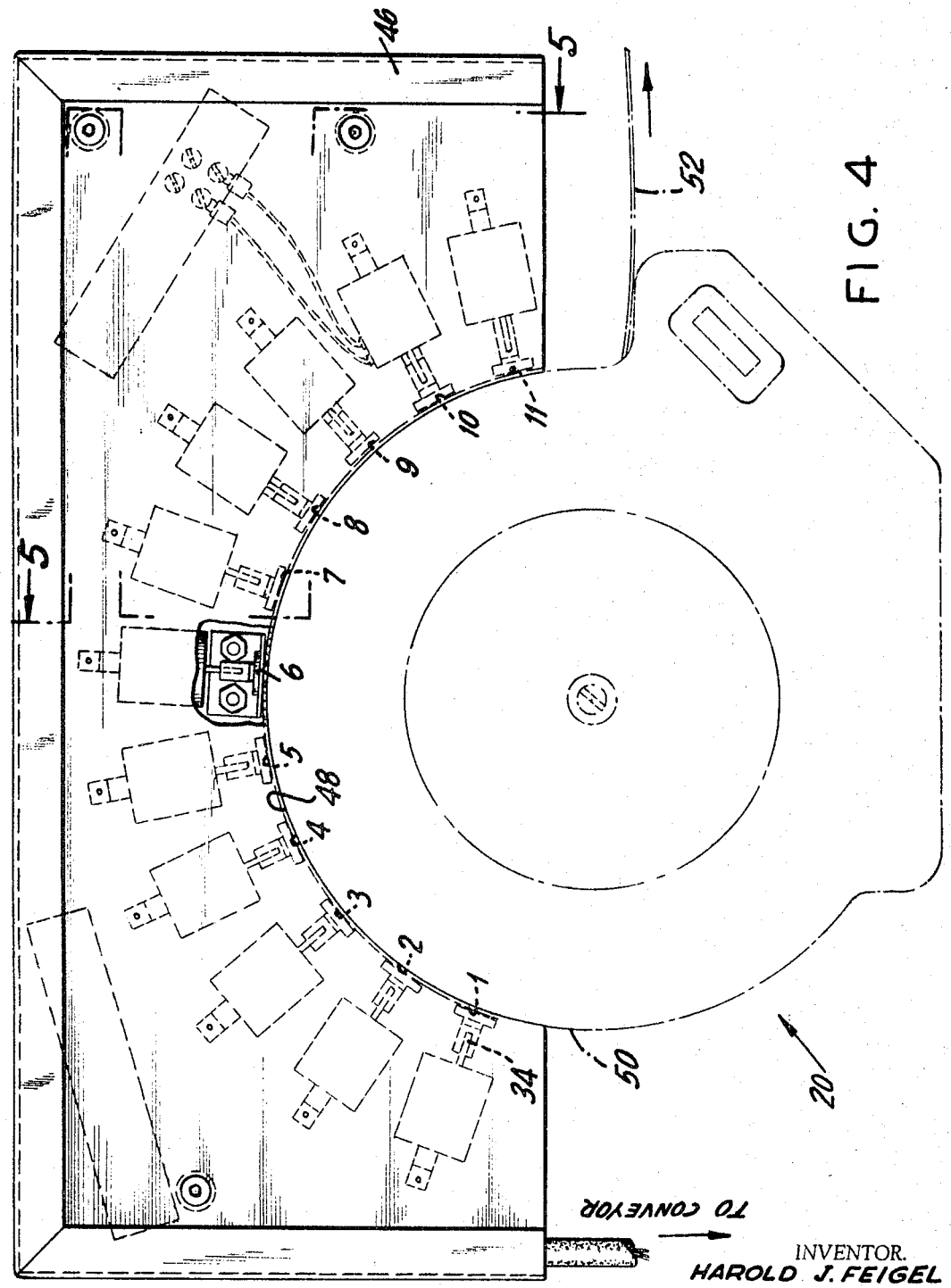
FIG. 4 is a partial elevational and sectional view of an actuating device associated with the conveyor mounted on a dispensing machine for dispensing a length of strip material.

Referring to the drawings in particular, the invention embodied therein comprises a device for indicating or sensing the length of a carton and for thereafter effecting the dispensing of a strip of sealing tape for sealing the carton in accordance with the length of the carton which has been sensed. After a container or carton 10 has been filled with goods or materials, it is usual to pass it over one or more conveyors 12, 14 or 16 to an operator's station 18 at which the container or carton must be sealed closed (see FIG. 1). It is usual to locate a commercial tape dispenser 20 adjacent the operator's station and the operator will then depress a key of the tape dispenser in order to dispense a length of sealing tape which would be necessary to close and seal a carton of a size which is moved to the operator's station. The tape dispenser 20 is of ordinary commercial type and may comprise, for example, tape dispenser of the type indicated in U.S. Patent No. 3,043,148 issued on July 10, 1962, to Theodore H. Krueger.

In accordance with the present invention, means are associated with one or more of the conveyors 12, 14 or 16 for automatically indicating or sensing the length of the container 10 and for thereafter actuating one of the sensing buttons of the tape dispenser 20 in order to dispense a length of tape which compares to the length of the container or carton and which is sensed. In FIGS. 2 and 3, a sensing conveyor constructed in accordance with the invention is generally designated 14' and it in cludes side frames 22 and 24 which rotatably mount a plurality of rollers 26 over which a container or carton 10' is directed.

The conveyor 14' is constructed such that at least some of the rollers 26 are supported in part on piston members 28 of a series of sensing switches generally designated 30. As best indicated in FIG. 7, the piston member 28 is supported on fluid contained within a cylinder 32 which is carried over a switching element or housing 34. A coil spring is disposed between a top plate portion of the piston 28 and a bottom plate portion resting on the switch housing 34 and aids the action of the switching element 34.

As indicated in FIG. 3 and as shown electrically in FIG. 8, a first switch 30a in the series is provided for setting contacts F by activating coil 54 of the latching relay comprised of relay coils 54 and 56. The remaining switches 30-1 to 30-11 will provide a meaningful indication and/or actuation in accordance with the length of the container 10' which is moved thereover after the first switch 30a is tripped. In FIG. 3, the first switch 30a has been tripped and the container is riding between switches designated 30-10 and 30-4 to arrive at the position indicated A in FIG. 3. When it has reached the position B in FIG. 3, it will effect actuation of a final switch, i.e. either 30b or 30b'. Only one switch 30b or 30b' is selectively positioned at either the close location 30b or the far location 30b' in accordance with the usual length of containers which are to be considered. By referring to the position B it can be seen that the switch 30b' is the active or used switch (switch 30b thus will not be used) so that when this switch 30b' is closed, the sensing operation is complete and the indication of the length will be through the switch designated 30-3, that is, the one underlying the rear of the container.

As can be seen from the electrical diagram of FIG. 8, a solenoid is associated with each of the switches 30-1 to 30-11 and are correspondingly designated sol-1 to sol-11. Thus, once switch 30b' is actuated, current will be directed from a current supply 33 through the switch 30b' through contacts F which had previously been closed by 30a, through open switches 30-11 to 30-4, through closed switch 30-3 and finally through sol-3. This actuation may be used to give an indication of the length of the carton as a reading unit such as inches, feet, etc. as determined by the spacing between the switch 30-3 and the switch 30b'. When switch 30b' is actuated, current will also flow through contacts F and through coil 56 of the latching relay comprised of relay coils 54 and 56. This will open contacts F and stop the flow of current through open switches 30-11 to 30-4, closed switch 30-3 and sol-3. Opening contacts F shortly after actuating switch 30b' therefore limits the flow of current through sol-3 to a momentary pulse.

In the embodiment of the invention indicated, the actuation of the solenoids in accordance with the length of the container sensed is used for actuating a tape dispenser 20 having a plurality of actuating buttons arbitrarily designated 1 to 11 which are spaced in an amount equivalent to the spacing of plungers 34 of the solenoids sol-1 to sol-11. Thus, when solenoid sol-3 is actuated, it provides effective control of the dispensing of tape from the tape dispenser 20 which will then be of a length as selected by the selector button 3 and which will compare to the length of the carton which has been indicated at the position B of FIG. 3.

The electrical control units are advantageously arranged within a container or housing 36 which is mounted directly on the conveyor 14'. An electrical cord 38 is provided for connecting a unit to a source of suitable power and a connection 40 connects the control unit 36 to the actuating device 46 that is mounted on the tape dispenser 20. As indicated a fuse 42 is provided for the unit and an off and on switch 44.

It should be noted that the control circuit includes a relay 54 in series with the switch 30a and a relay 56 in series with the switch 30b'. The off-on switch 44 is schematically indicated in FIG. 8, together with an indicator light 58.

Figure 5:
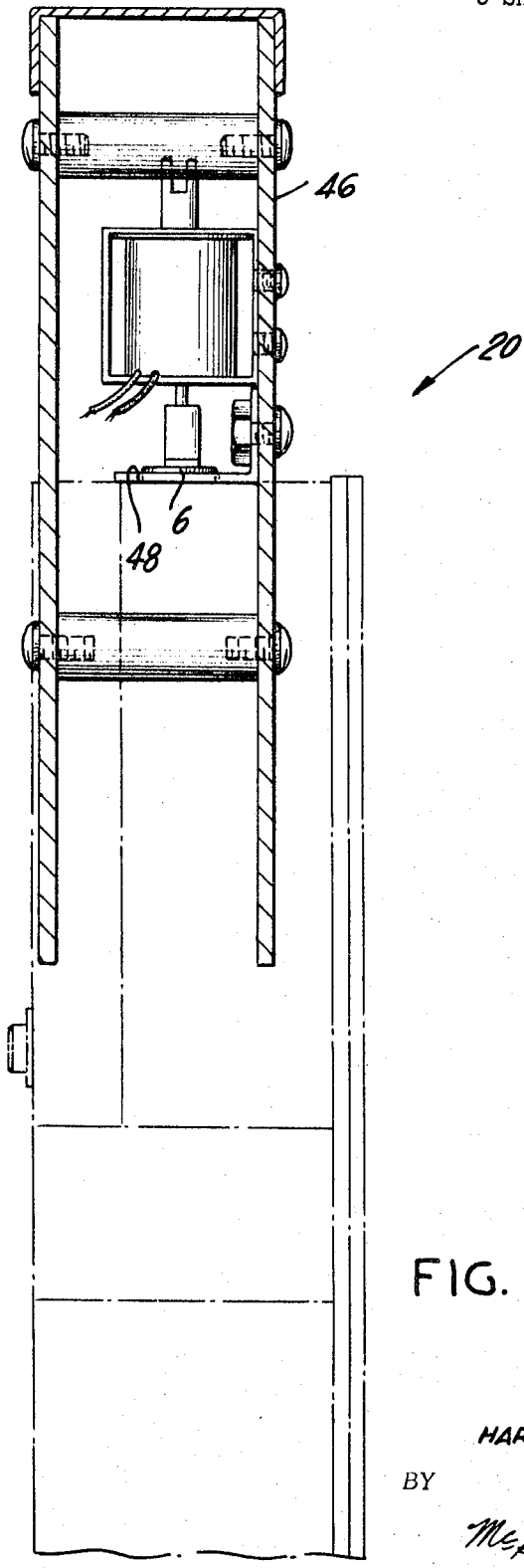
FIG. 5 is a section taken on the line 5—5 of FIG. 4.

The solenoids sol-1 to sol-11 are mounted in a housing 46 (FIGS. 4 and 5) having a curved bottom face 48 which is adapted to rest over the curved face 50 of the tape dispensing machine 20. The tape which is dispensed by the tape dispenser 20 is indicated at 52 in FIG. 4.

Contacts F in FIG. 8 are closed when current flows through relay coil 54 of the latching relay comprised of relay coils 54 and 56 and are opened when current flows through relay coil 56. The preferred arrangement of 4 parallel contacts F provides redundancy and extends the useful life of the commercially bought latching relay. Capacitor G minimizes electrical arcing across contacts F and further extends the life of the relay.

While a specific embodiment of the invention has been shown and described in detail to illustrate the application of the inventive principles, it will be understood that the invention may be embodied otherwise without departing from such principles.

What is claimed is:

1. A container length sensing device comprising means defining a pathway over which the container is moved, a plurality of sensing switches connected to said pathway defining means at predetermined spaced locations along said pathway, said pathway defining means at predetermined spaced locations along said pathway, said pathway defining means being movable by the weight of said container to actuate said switches which are aligned below said container and said pathway defining means, and means connected to said switches and responsive to those of said switches which have been actuated to indicate the length of said container, said means defining said pathway including a roller conveyor, said roller conveyor including a plurality of rollers rotatably mounted at spaced locations along the length thereof, and means supporting said rollers adjacent said switches permitting deflection of said rollers when a container is positioned over respective ones thereof for actuating said switches.

2. A container length sensing device comprising means defining a pathway over which the container is moved, a plurality of sensing switches connected to said pathway defining means at predetermined spaced locations along said pathway, said pathway defining means being movable by the weight of said container to actuate said switches which are aligned below said container and said pathway defining means, means connected to said switches and responsive to those of said switches which have been actuated to indicate the length of said container, said means connected to said switches to indicate the lengh of said container including a solenoid for indicating each separate length unit, and means for mounting said solenoids in a position over separate actuating elements for dispensing a selective length of strip material.

3. A container length sensing device comprising means defining a pathway over which the container is moved, a plurality of sensing switches connected to said pathway defining means at predetermined spaced locations along said pathway, said pathway defining means being movable by the weight of said container to actuate said switches which are aligned below said container and said pathway defining means, means connected to said switches and responsive to those of said switches which have been actuated to indicate the length of said container, tape dispensing means having a plurality of separate actuating buttons, said means for indicating the length of the container including a separate solenoid for each of said buttons and actuable by said switches which have been actuated to excite a selected solenoid to actuate a selected button to said tape dispensing machine.

4. A container length sensing device according to claim 3, wherein the means defining the pathway includes a roller conveyor having a plurality of substantially equally spaced rollers, and resilient means for resiliently supporting said rollers at at least one end thereof.

5. A container length sensing device according to claim 4, wherein said resilient means includes a piston slidable in a fluid cylinder.

6. A container length sensing device according to claim 4, including spring means surrounding said piston for additionally supporting said roller.

7. A container length sensing device comprising means defining a pathway over which the container is moved, a plurality of switches connected to said pathway defining means at predetermined spaced locations along said pathway, said pathway defining means being movable by the weight of said container to actuate said switches which are aligned below said container and said pathway defining means, and means connected to said switches and responsive to those of said switches which have been actuated to indicate the length of said container, said means connected to said switches to indicate the length of said container including a solenoid for indicating each separate length unit, a tape dispenser device having a plurality of actuating buttons for dispensing a distinct length of tape, means for mounting said solenoids in a position in alignment with respective ones of said actuating buttons for actuating said buttons in accordance with which solenoid is actuated, and relay means connected electrically to said solenoids for providing a momentary actuating pulse to actuate said solenoid and a subsequent release thereof after said solenoid actuates a respective button.

8. A container length sensing device comprising means defining a pathway over which the container is moved, a plurality of sensing switches arranged at predetermined spaced locations along said pathway, each sensing switch having an actuator which is located in a position to be actuated by movement of an article along said pathway to a position in alignment with said actuator, said actuator being deactuated when the article moves further along the pathway out of alignment with said actuator, electrical circuit means including a control switch having a control actuator spaced from the last one of said sensing switches and being constructed to become actuated upon movement of an article along said path to a position in alignment with said control actuator, and means connected to said sensing switches and to said control switch and responsive to those of said sensing switches which remain actuated when said control switch is actuated to indicate the length of said container.

9. A container length sensing device according to claim 8, wherein said means defining said pathway includes a roller conveyor, said indicating means comprising means for dispensing a length of tape in accordance with the length of the article which has been sensed.

References Cited

UNITED STATES PATENTS

| | | | |
|---|---|---|---|
| 1,988,702 | 1/1935 | Reeve | 209—82 |
| 2,630,043 | 3/1953 | Kolisch | 209—82 X |
| 3,199,262 | 8/1965 | Miller et al. | 53—66 |

TRAVIS S. McGEHEE, Primary Examiner

U.S. Cl. X.R.

53—137; 156—360; 198—39; 209—82